April 16, 1935.  F. B. POWERS  1,997,699

CONTROL SYSTEM

Filed June 21, 1933

WITNESSES:
Leon J. Jaza

INVENTOR
Frank B. Powers
BY
ATTORNEY

Patented Apr. 16, 1935

1,997,699

UNITED STATES PATENT OFFICE 1,997,699

CONTROL SYSTEM

Frank B. Powers, Wilkinsburg, Pa., assignor to Westinghouse Electric & Manufacturing Company, East Pittsburgh, Pa., a corporation of Pennsylvania Application June 21, 1933, Serial No. 676,850

8 Claims. (Cl. 171—228)

My invention relates, generally, to control systems, and more particularly to control systems which are responsive to voltages of predetermined frequency such as may be developed by dynamo-electric machines of various types.

It is known that a voltage is produced in the field windings of dynamo-electric machines, such for example, as direct and alternating current motors of the variable speed, commutator type, which is of a frequency directly proportional to the number of slots in the armature of the motor and the speed of rotation of the armature. Since the number of slots in the armature of a particular machine is fixed by the design, the frequency of the voltage produced in the field windings varies directly with the speed and this voltage appears as double slot frequency across the terminals of the field windings of the machine.

An object of my invention is to provide for utilizing the slot frequency voltage of a dynamo-electric machine to control the operation of speed-responsive devices of various types.

A further object of my invention is to provide a control system which shall be responsive to a predetermined slot frequency voltage.

Other objects of my invention will be described fully hereinafter or will be apparent to those skilled in the art.

According to one embodiment of my invention a circuit is provided for filtering out the fundamental machine frequency and impressing the slot frequency voltage upon a series of tuned circuits to cause a relay to operate when the machine reaches a predetermined definite speed. The constants of the filter circuit may be changed to cause the relay to operate at various frequencies, and also the filter circuit may be so designed that the relay will be energized at a predetermined frequency, kept energized over a definite band of frequencies, and deenergized at a predetermined frequency.

For a fuller understanding of the nature and scope of my invention, reference may be had to the following detailed description, taken in conjunction with the accompanying drawing, in which.

Figure 1:
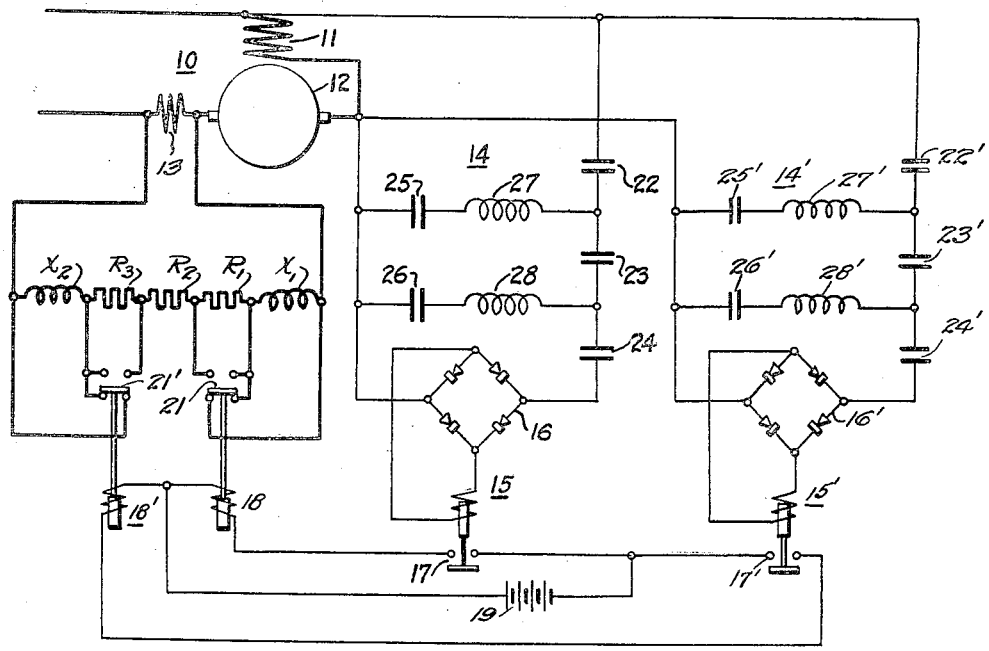
Figure 1 is a diagrammatic view of a control system embodying my invention.

Referring to the drawing, the system shown in Fig. 1 comprises a motor 10 of the variable speed commutator type. The motor 10 may be either a direct current or an alternating current machine and it is provided with a series field winding 11, an armature winding 12 and an interpole winding 13. The motor may be connected to any suitable source of power (not shown) to operate it.

Figure 2:
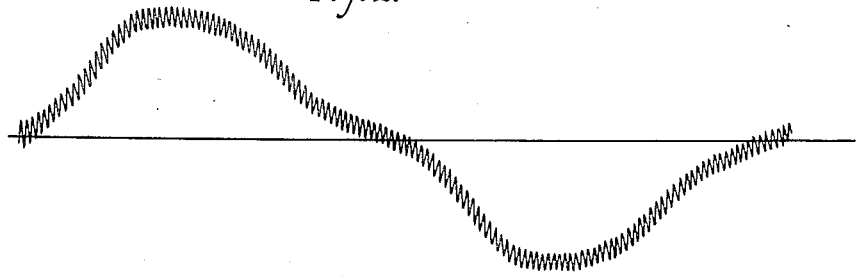
Fig. 2 is a representation of an oscillogram, showing a slot frequency voltage wave superimposed on a 25 cycle voltage wave.

As stated hereinbefore, a high-frequency voltage is produced in the field winding 11 of the motor, which is known as the slot frequency voltage. The frequency of this voltage is directly proportional to the speed at which the motor operates and the number of armature slots. The high-frequency voltage is superimposed on the normal voltage wave of the main field circuit, as shown by the oscillogram illustrated in Fig. 2. Since the number of slots in the armature is constant, the slot frequency varies directly with the speed and it may be utilized as a means of measuring the speed of the machine by providing a filter circuit for filtering out the fundamental machine frequency.

The theory of operation and design of filter circuits are well known, particularly in telephone circuits. Filter circuits may be readily designed which will pass current below a predetermined frequency, known as low pass filters, or above a predetermined frequency, known as high pass filters. Also filters may be designed to pass current over a definite band of frequencies, these are known as band pass filters.

By way of example, the filter circuit 14, illustrated in Fig. 1 may be designed to pass current and operate an auxiliary relay 15 through a rectifier 16 at frequencies above 2500 cycles. When the contact members 17 of the auxiliary relay 15 are closed, a relay 18 is energized from a battery 19, thereby actuating the contact members 21 of the relay 18. Therefore, the relay 18 is energized when the motor 10 attains a speed at which the slot frequency voltage produced in the field winding 11 has a frequency of 2500 cycles, or above.

Figure 3:
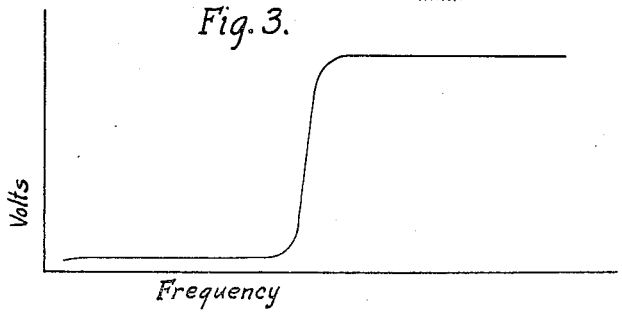
Fig. 3 is a graphical view, illustrating the voltage transmission curve of the filter circuit shown in Fig. 1.

The filter circuit 14 comprises condensers 22, 23, 24, 25 and 26, inductive coils 27 and 28 and a rectifier 16, connected across the field winding 11 of the motor 10. As illustrated in Fig. 3, the filter will pass current at frequencies above 2500 cycles when the condensers 22 and 24 each equals 2.132 microfarads, the condenser 23 equals 1.066 microfarads, the condensers 25 and 26 each equals 2.38 microfarads, the inductances 27 and 28 each equals 2.66 millihenries, and the rectifier 16 has a resistance of 50 ohms.

As previously stated, the frequency at which the filter will pass current may be varied by changing the constants of the filter circuit. Thus any number of relays may be operated in sequence, at various frequencies corresponding to various speeds of the motor, by providing additional filter circuits, such as the circuit 14', which will pass current at the frequencies corresponding to the desired speeds.

The rectifier 16 is provided to supply direct current for operating the auxiliary relay 15, thereby permitting the use of a direct-current relay, which is simpler in construction than an alternating current relay. The relay 15 may be of a standard type, utilized in telephone circuits, which requires a small amount of energy to operate it. Since rectifiers of the copper-oxide type have a practically constant impedance with variable frequency, the operation of the filter circuit is not affected by the use of the rectifier 16. Energy for operating the relay 18 may be supplied by a battery 19, thereby permitting the use of a relay of a type suitable for controlling electric circuits carrying comparatively high values of current.

The control system herein described may be utilized for numerous applications in which it is desired to control the operation of certain devices in accordance with the speed of a rotating machine. For example, the present system may be utilized to control the operation of switching devices for adjusting the resistance and reactance in an interpole shunt circuit 29 for the motor 10 to maintain good commutation over a wide range in speed.

As described in the copending application of S. H. Cowin and L. J. Hibbard, Serial No. 562,878, filed September 15, 1931 now Patent No. 1,922,724, issued August 15, 1933 and assigned to the Westinghouse Electric & Manufacturing Company, the proper strength of the interpole field 13 of the commutator motor 10 to secure good commutation at various speeds of the motor may be provided by changing the relative values of resistance and reactance of the interpole shunt 29, which is composed of resistors R1, R2 and R3 and reactors X1 and X2, and is connected in parallel-circuit relation to the interpole field winding 13, thereby varying the amount and the phase position of the current in the interpole winding. A plurality of switches, such as 18 and 18', may be provided to shunt predetermined portions of the resistance and reactance of the interpole shunt 29 as the speed of the motor is varied. The operation of these switches may be automatically controlled, in accordance with the speed of the motor, by means of the system herein described, instead of being manually controlled, as described in the copending application of Cowin and Hibbard.

Numerous other applications for control systems of the type herein described will be evident to those skilled in the art.

From the foregoing description it is evident that I have provided a speed-responsive control system which has numerous advantages over previously known systems utilizing speed indicating devices of a mechanical type. The system herein described has no rotating parts that require replacement or adjustment. When once applied and properly connected it will function properly during the life of the machine. The apparatus required is small, light in weight, simple and inexpensive, and will operate on a small amount of energy. It may be adjusted to pass, or eliminate all frequencies above or below any definite frequency, or any definite band or bands of frequencies.

I do not desire to be restricted to the specific embodiment of my invention herein shown and described, since it is evident that it may be changed and modified without departing from the spirit and scope of my invention as defined in the appended claims.

I claim as my invention:

1. In a control system, in combination, an electric motor having a field winding in which a voltage is produced having a frequency directly proportional to the speed of the motor, a filter circuit connected across the field winding, said filter circuit being disposed to pass current at a predetermined frequency, and control means operated in accordance with the current passing through the filter circuit, whereby the control means is responsive to the speed of the motor.

2. In a control system, in combination, an electric motor having a winding in which a voltage is produced having a frequency directly proportional to the speed of the motor and the number of slots in the armature of the motor, a filter circuit disposed to be energized by said voltage and designed to pass current above a predetermined frequency, and control means operated by the current passing through the filter circuit, whereby the control means is responsive to the speed of the motor.

3. In a control system, in combination an electric motor having a winding in which a voltage is produced having a frequency directly proportional to the speed of the motor and the number of slots in the armature of the motor, a filter circuit disposed to be energized by said voltage and designed to pass current below a predetermined frequency, and control means operated in response to current passing through the filter circuit, whereby the control means is rendered responsive to the speed of the motor.

4. In a control system, in combination, an electric motor having a winding in which a voltage is produced having a frequency directly proportional to the speed of the motor and the number of slots in the armature of the motor, a filter circuit disposed to be energized by said voltage and designed to pass current over a predetermined band of frequencies, and control means operated by the current passing through the filter circuit, whereby the control means is responsive to the speed of the motor.

5. In a control system, in combination, an electric motor having a winding in which a voltage is produced having a frequency directly proportional to the speed of the motor and the number of slots in the armature of the motor, a filter circuit disposed to be energized by said voltage and designed to pass current at a predetermined frequency, means for rectifying the current passed through the filter, and control means operated by said current, whereby the control means is responsive to the speed of the motor.

6. In a control system, in combination, an electric motor having a winding in which a voltage is produced having a frequency directly proportional to the speed of the motor and the number of slots in the armature of the motor, a filter circuit disposed to be energized by said voltage and designed to pass current at a predetermined frequency, means for rectifying the current passed through the filter, and relay means disposed to be operated by said current, whereby said relay means is responsive to the speed of the motor.

7. In a control system, in combination, an electric motor having a winding in which a voltage is produced having a frequency directly proportional to the speed of the motor and the number of slots in the armature of the motor, a filter circuit disposed to be energized by said voltage and adapted to pass current at a predetermined frequency, means for rectifying the current passed through the filter, an auxiliary relay disposed to be controlled by said current in accordance with the speed of the motor, and a control relay controlled by the operation of the auxiliary relay.

8. In a control system, in combination, an electric motor having an interpole winding and having a winding in which a voltage is produced having a frequency directly proportional to the speed of the motor and the number of slots in the armature of the motor, filter circuits disposed to be energized by said voltage and designed to pass current at predetermined frequencies, an interpole shunt for the interpole winding of said motor, switching means for controlling said shunt, and control means operated by the current passing through the filter circuits for controlling said switching means, whereby the shunt is controlled in accordance with the speed of the motor.

FRANK B. POWERS.